(No Model.)
D. ALMOND.
Fur Mixer or Deviling Machine.
No. 230,164. Patented July 20, 1880.
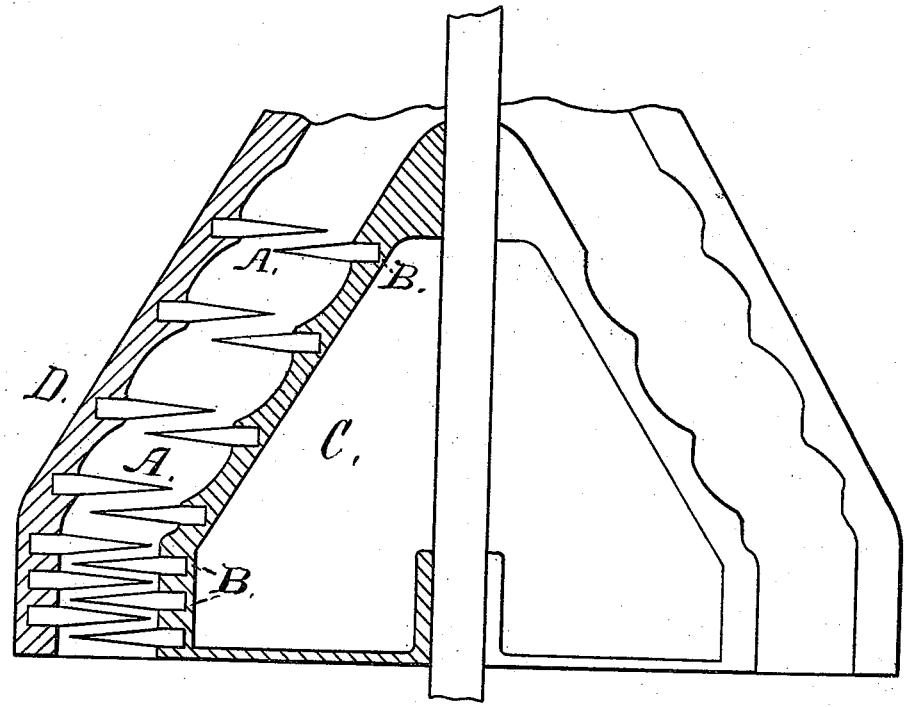

UNITED STATES PATENT OFFICE.

DAVID ALMOND, OF NEWARK, NEW JERSEY.

FUR-MIXER OR DEVILING-MACHINE.

SPECIFICATION forming part of Letters Patent No. 230,164, dated July 20, 1880.

Application filed June 4, 1880. (No model.)

*To all whom it may concern:*

Be it known that I, DAVID ALMOND, of Newark, in the county of Essex and State of New Jersey, have invented a new and useful Improvement in a Fur-Mixer or Deviling-Machine, of which the following is a specification.

My invention relates to the process of securing the teeth in a fur-mixer or deviling-machine to make them stronger and more secure than they have hitherto been.

The teeth have formerly been set in the cylinder and in the shell by screw-threading each and screwing the teeth in place, or by putting the shank through the cylinder, &c., and turning a nut on the end. They were also made with a shoulder setting against the cylinder, &c., leaving the shank smaller than the shoulder portion and weaker than it should be.

In either of the above methods of securing the teeth they were liable to get loose and come out, which, when one did in the machine, it wrought much damage, knocking out other teeth, &c.

To overcome these difficulties is the object of my invention; and it consists in the process, as herein described, of rendering the teeth stronger and positively fixed in their position.

The figure is a section, in elevation, of so much of the machine as will be needed to show the position of the teeth.

The teeth A are forged with the shank B, having parallel sides and no shoulder. The shanks of the teeth are dipped in a flux of borax in solution, or some equivalent flux, and the teeth are then set in the mold in the places they are to occupy in the cylinder C and the shell D, so that the metal, when cast to them, will close about the shanks and over the ends, and become so thoroughly incorporated with the teeth that any loosening of the teeth will be impossible, as the surface of the shanks and of the ends of the teeth will be fused or welded in with the cast metal, and the shank being the full size, without a shoulder, will be less liable ever to be broken off.

What I claim as my invention, and desire to secure by Letters Patent, is—

The process of securing the teeth in a fur-mixer or deviling-machine, substantially as herein shown and described, consisting in dipping the shank end of the teeth in a suitable flux in solution and in placing the teeth in the molds and casting them into the cylinder and shell, for the purpose set forth.

DAVID ALMOND.

Witnesses:
HORACE HARRIS,
JOSEPH A. ENO.